United States Patent [19]

Minoda et al.

[11] Patent Number: 5,301,183
[45] Date of Patent: Apr. 5, 1994

[54] INFORMATION RECORDING DISCS

[75] Inventors: Takeshi Minoda; Masayoshi Kurisu, both of Ichihara, Japan

[73] Assignee: Mitsui Petrochemical Industries Ltd., Tokyo, Japan

[21] Appl. No.: 999,534

[22] Filed: Dec. 31, 1992

Related U.S. Application Data

[63] Continuation of Ser. No. 278,238, Nov. 30, 1988, abandoned.

[30] Foreign Application Priority Data

Dec. 1, 1987 [JP] Japan .................. 62-183218

[51] Int. Cl.⁵ ............................................. G11B 23/00
[52] U.S. Cl. ................................... 369/280; 369/282; 369/290; 369/270; 369/271
[58] Field of Search ............... 369/280, 282, 270, 271, 369/272, 289, 290; 360/133

[56] References Cited

U.S. PATENT DOCUMENTS

| 4,613,921 | 9/1986 | Holmes | 369/290 X |
| 4,827,468 | 5/1989 | Odawara et al. | 369/282 |
| 4,860,278 | 8/1989 | Nakahara | 369/271 |
| 4,871,404 | 10/1989 | Murata et al. | 369/282 |

FOREIGN PATENT DOCUMENTS

| 192244 | 8/1986 | European Pat. Off. | |
| 230695 | 8/1987 | European Pat. Off. | |
| 0270182 | 6/1988 | European Pat. Off. | |
| 2624375 | 12/1977 | Fed. Rep. of Germany | |
| 2542900 | 3/1984 | France | |
| 217246 | 12/1984 | Japan | |
| 59-217246 | 12/1984 | Japan | 369/282 |
| 59217246 | 12/1984 | Japan | 369/282 |
| 146971 | 9/1985 | Japan | |
| 186565 | 12/1985 | Japan | |
| 62-058473 | 3/1987 | Japan | |
| 62-114151 | 5/1987 | Japan | |
| 62-129985 | 6/1987 | Japan | |
| 62-134854 | 6/1987 | Japan | 369/270 |
| 81670 | 4/1988 | Japan | |
| 63-129578 | 6/1988 | Japan | |
| 173289 | 7/1988 | Japan | |
| 63-206946 | 8/1988 | Japan | 369/282 |
| 63-255884 | 10/1988 | Japan | 369/270 |
| 64-050289 | 2/1989 | Japan | |
| 1-50289 | 2/1989 | Japan | 369/270 |

Primary Examiner—Eugene R. LaRoche
Assistant Examiner—Tan Nguyen

[57] ABSTRACT

Information recording discs comprise a disc substrate having a recording layer on one side thereof, one hub having an insertion portion to be inserted into a center hole of the disc substrate and a flange portion to cover the disc substrate in the vicinity of the center hole, at least an apex of the insertion portion being composed of a magnetic material, the hub being inserted into the center hole so that the flange portion is positioned on the recording layer side of the disc substrate, and an adhesive layer is provided between the flange portion and the disc substrate. By this construction, a portion of the hub which protrudes from the back surface of the disc substrate, facing toward the spindle of a turn table can be altered in dimension and/or the diameter of the protrusion portion of the hub can be made smaller than that of the center hole of the disc substrate. Thus, the hub has a large degree of freedom of shape and can have a structure fitted to the shape of a turn table, while still providing a large adhesive surface between the hub and the disc substrate for strength.

6 Claims, 2 Drawing Sheets

INFORMATION RECORDING DISCS

This application is a continuation of application Ser. No. 07/278,238, filed Nov. 30, 1988, now abandoned.

FIELD OF THE INVENTION

This invention relates to information recording discs which are used as optical discs and the like and particularly to information recording discs which are clamped by a magnet clamping system.

BACKGROUND OF THE INVENTION

Information recording discs to perform storing and reading information by converging rays of light such as laser beam and the like on recording layers of the discs are known, said information recording discs being prepared by laminating at least two plastic disc substrates, each having a recording layer on one surface thereof, directly or via spacers with adhesives so that the recording layers face to each other. A magnet clamping system is one of clamping systems for clamping such information recording discs of the type as referred to above.

In the accompanying drawings, FIG. 4 is a sectional view of an information recording disc, showing the state wherein the disc is going to be clamped by a conventional magnet clamping system, for example, such as disclosed in Japanese Patent L-O-P Publn. No. 167663/1987. In FIG. 4, 1 is an information recording disc, which is so assembled that two transparent plastic disc substrates 2 are laminated together via an inner peripheral spacer 4 and an outer peripheral spacer (not shown) so that recording layers 3 face to each other, hubs 6 are fitted individually from above and below to a center hole 5 of the two disc substrates 2 and bonded with adhesive layers 7 to the top and bottom surfaces of the laminated disc substrate. The information recording disc 1 thus assembled is contained in a cartridge 8 and fitted onto a turn table 9 to effect storing and reading of information. In the turn table 9, it is so designed that a concavity 10 equipped with a magnet 11 and a yoke 12 is provided so as to attract and set the hubs 6 on the turn table 9 and said hubs 6 are positioned by inserting a spindle 13 into center holes of the hubs 6, thereby setting and holding the information recording disc 1 on the turn table 9.

The information recording disc 1 set on the turn table 9 in the manner now described is rotated, and information is stored in or read from the recording layers 3 by irradiation from the bottom with a laser beam or the like through the laminated disc substrate 2.

The information recording disc 1 comprises two disc substrates 2 laminated together, each having a recording layer, and is assembled and used in the manner as illustrated above. When an amount of information to be recorded is small, however, it is taken into consideration that the information is stored or read by means of an information recording disc comprising one disc substrate having a recording layer, said information recording disc being used for storing or reading information likewise after containing it in the cartridge 8.

FIG. 5 is a sectional view of a conventional single substrate type information recording disc which is one of the two parts obtained by simply dividing the information recording disc of FIG. 4 into two halves. That is, this information recording disc 1 is assembled by inserting an insertion portion 6a of a hub 6 having a flange portion 6b into a center hole of a disc substrate 2 having a recording layer 3 from the side opposite to the recording layer 3, and bonding the disc substrate 2 with an adhesive layer 7 to the flange portion 6b. In the same manner as in the case of the information recording disc of FIG. 4, the information recording disc 1 of FIG. 5 is used likewise for storing or reading information after inserting the hub 6 into a concavity 10 equipped with a magnet 11 and a yoke 12 of a turn table 9 to attract the hub 6 thereto, and inserting a spindle 13 into a center hole 14 of the hub 6 to position and set the information recording disc on the turn table 9.

In the conventional single substrate type information recording disc as mentioned above, however, there were such problems that because the flange portion 6b of the hub 6 is positioned at the side of the disc substrate 2 opposite to the recording layer 3, in a case wherein a clamping area 15 on the concavity 10 of the turn table 9 is small in diameter, the diameter of the flange portion 6b becomes small and an adhesive surface thereof also becomes small, and in a case wherein the diameter of the clamping area 15 is the same as or smaller than that of the center hole 5, the flange portion 6b disappears, so adhesion of the disc substrate 2 to the hub 6 is attained only at the edge face of the insertion portion 6a, thus in either case the adhesion strength between the disc substrate 2 and the hub 6 decreases. Further, there was a similar problem when the clamping area formed on the concavity 10 of the turn table 9 is shallow, and when no concavity 10 is present at all in the clamping area 15, that is, when the back surface of the hub 6 and that of the disc substrate 2 are on the same level, there was also such problem that the disc substrate 2 is bonded to the hub 6 only at the edge face thereof.

OBJECT OF THE INVENTION

The present invention is intended to solve the above-mentioned problems, and an object of the invention is to provide information recording discs in which an adhesion surface between a hub and a disc substrate can be made large and thereby to increase an adhesion strength therebetween even when a diameter and depth of a clamping area of a turn table are designed to be made small.

SUMMARY OF THE INVENTION

The present invention is directed to an information recording disc comprising one disc substrate having a center hole and a recording layer on one side thereof, one hub having an insertion portion inserted into the center hole of said disc substrate and a flange portion covering a part of said disc substrate in the vicinity of said center hole, at least the lower portion of said insertion portion opposite the flange portion being composed of a magnetic material and said hub being fitted into said center hole so that said flange portion is positioned on the recording layer side of said disc substrate, and an adhesive layer formed between said hub and disc substrate.

Figure 1:
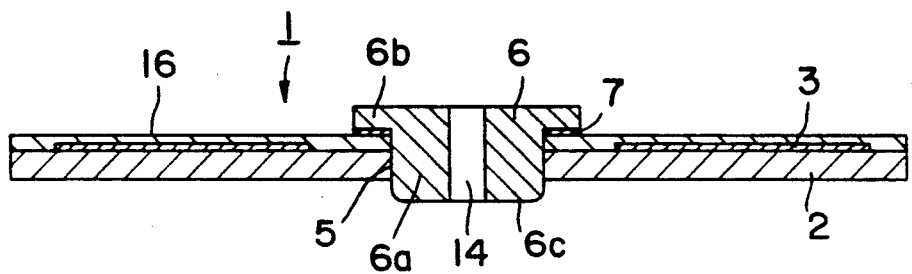
FIGS. 1-3 are sectional views of single substrate type information recording discs obtained in separate examples of the present invention, respectively.

In the figures:
1: Information recording disc
2: Disc substrate
3: Recording layer
5: Center hole
6: Hub
6a: Insertion portion
6b: Flange portion
6c: Protrusion portion
7: Adhesive layer
16: Protective layer

DETAILED DESCRIPTION OF THE INVENTION

Materials which may be used for forming the disc substrate include transparent thermoplastic resins such as polycarbonates, polymethyl methacrylates and polyolefins. Preferred resins are copolymers of ethylene and cycloolefins represented by the following formulas [I] or [II], and preferred copolymers are those having the ethylene content of 40–85 mol %, preferably 50–80 mol %. Particularly preferred resins for forming the disc substrate include cycloolefin type random copolymer compositions comprising components (A) a cycloolefin type random copolymer comprising an ethylene component and a cycloolefin component represented by the following general formula [I] or [II], said copolymer having an intrinsic viscosity [$\eta$] of 0.05–10 dl/g as measured in decalin at 135° C. and a softening temperature (TMA) of at least 70° C., and (B) a cycloolefin type random copolymer comprising an ethylene component and a cycloolefin component represented by the following general formula [I] or [II], said copolymer having an intrinsic viscosity [$\eta$] of 0.01–5 dl/g as measured in decalin at 135° C. and a softening temperature (TMA) of less than 70° C., the weight ratio of said component (A)/component (B) being 100/0.1 to 100/10. Preferably, the component (A) contains 40–85 mol %, preferably 50–75 mol % of ethylene, and the component (B) contains 60–98 mol %, preferably 60–95 mol % of ethylene:

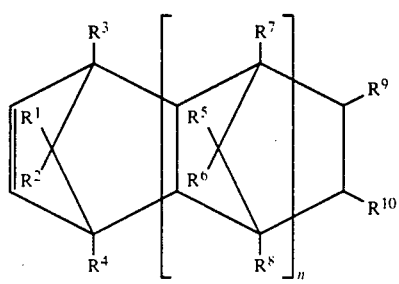

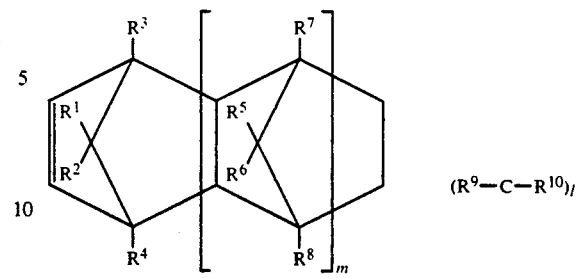

wherein n and m are each zero or a positive integer, l is an integer of 3 or more, $R^1$ to $R^{10}$ each represent hydrogen atom, halogen atom or hydrocarbon radical.

The hubs may be those made of any materials so long as at least the lower portion of an insertion portion of said hubs opposite the flange is composed of a magnetic material. Magnetic material as used in the present invention is meant a magnetic material itself or a composite of a magnetic material and other materials. The magnetic materials concretely (1) magnetic metals, (2) magnetic material-blended plastics and (3) plastics having fitted a magnetic metal to the lower portion of the insertion portion thereof. From the standpoint of strength and attraction force, preferred hubs are those made of (1) magnetic metals. Adhesives used for bonding the hub to the disc substrate are preferably those of epoxy type, particularly epoxy resins of ultraviolet-curing type, though any adhesives other than those mentioned above are also usable.

The information recording discs of the present invention may be prepared by inserting the insertion portion of the hub into the center hole of the disc substrate from the side of the recording layer of said disc substrate, and bonding the hub to the disc substrate by means of the adhesive layer formed therebetween.

The information recording disc thus prepared is fitted onto a turn table by attracting the magnetic portion of insertion portion of the hub to a magnet of the turn table. In that case, even when a diameter and depth of a clamping area of the turn table are small, the insertion portion of the hub can be changed in dimension according to the dimension of the clamping area of the turn table, and in that case the adhesion strength between the hub and the disc substrate can be increased by making large the flange portion of the hub and thereby to enlarge an adhesive surface between said flange portion and said disc substrate.

EFFECT OF THE INVENTION

Since the information recording discs of the present invention have such a structure that the insertion portion of the hub is inserted into the center hole of the disc substrate so that the flange portion of the hub is positioned on the recording layer side of the disc substrate, and the hub is bonded to the disc substrate by the adhesive layer formed between the flange portion of the hub and the disc substrate, the portion of the hub projecting from the surface of the disc substrate facing to the spindle side of the turn table can be optionally changed and also a diameter of said projecting portion of the hub can be made smaller than that of the center hole of the disc substrate. On that account, there are obtained such effects that the hub has a large degree of freedom of shape and can have a structure fitting with the shape of the turn table and, at the same time, the adhesive surface between the hub and the disc substrate can be made large to increase the adhesive strength.

The present invention is illustrated below with reference to example given in terms of the accompanying drawings, but it should be construed that the invention is in no way limited thereto.

EXAMPLE

Figure 2:
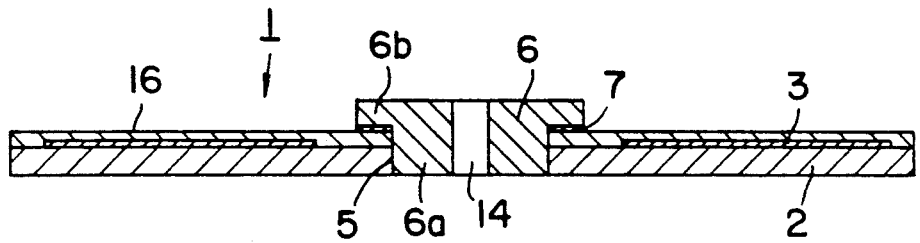
Figure 3:
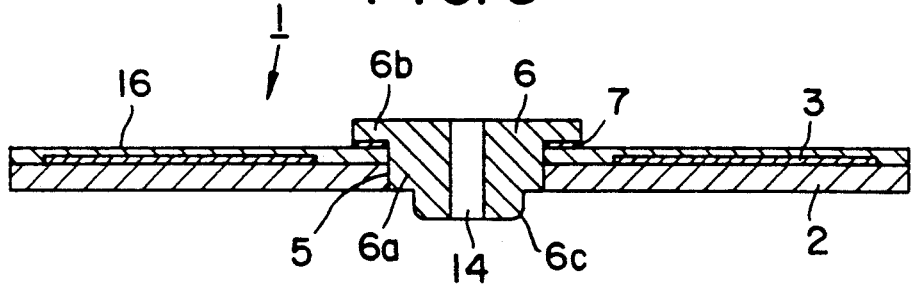

FIGS. 1–3 are sectional views showing information recording discs obtained in separate examples, respectively. In the figures, 1 is an information recording disc, and the surface of a disc substrate 2 on which a recording layer 3 is formed is coated with a protective layer 16 made of plastics or the like. A hub 6 is fitted in a center hole 5 of the disc substrate 2. The hub 6 is made of a magnetic metal, and has an insertion portion 6a, a flange portion 6b and a center hole 14 in the center thereof. The insertion portion 6a is inserted into the center hole 5 of the disc substrate 2, and the flange portion 6b is positioned so as to cover the surface of said disc substrate 2 in the vicinity of the center hole 5, said surface having the recording layer 3 thereon. An adhesive layer 7 is formed via the protective layer 16 between the flange portion 6b and the disc substrate 2, wherein said flange portion 6b and said disc substrate 2 are integrally bonded to each. In FIG. 1, the insertion portion 6a of the hub 6 protrudes to form a protrusion portion 6c having the same diameter as that of the insertion portion 6a. In FIG. 2, the back surface of the insertion portion 6a of the hub is flush with that of the disc substrate 2. In FIG. 3, the insertion portion 6a of the hub 6 protrudes to form a protrusion portion 6c having a diameter smaller than that of the insertion portion 6a.

The information recording disc 1 having a such structure as mentioned above is assembled by inserting the insertion portion 6a into the center hole 5 so that the flange portion 6b of the hub 6 is positioned on the surface of the disc substrate 2, said surface having formed the recording layer 3 thereon, and filling the adhesive layer 7 in between the flange portion 6b of the hub 6 and the protective layer 16 of the disc substrate 2, thereby bonding the hub 6 to the disc substrate 2.

Figure 4:
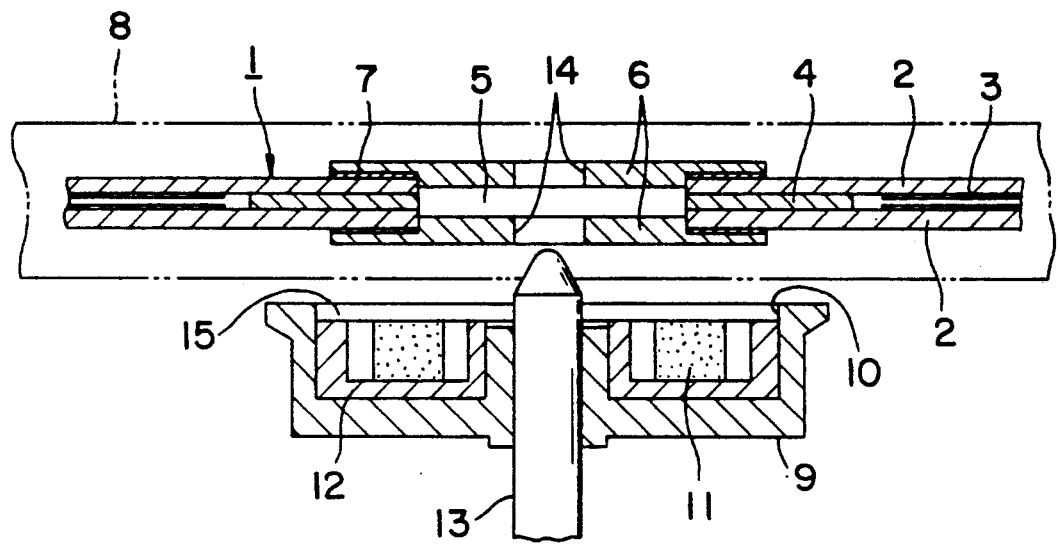
FIG. 4 is a sectional view of a conventional information recording disc comprising two disc substrates laminated to each other, shown in the state wherein the disc is going to be clamped by a conventional magnet clamping system.
Figure 5:
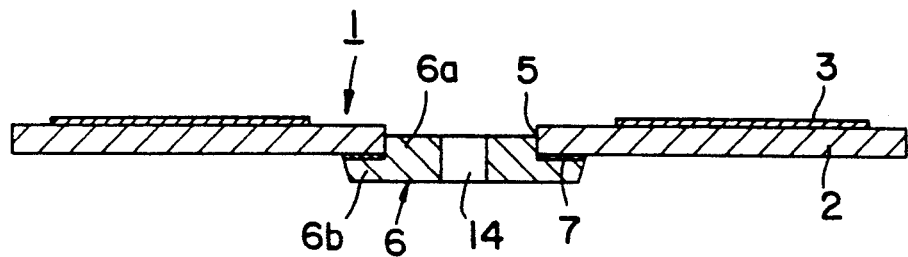
FIG. 5 is a sectional view of a conventional single substrate type information recording disc.

The information recording discs thus assembled are contained in a cartridge 8 in the same manner as in the case of the information recording disc of FIG. 4, the magnetic lower portion of the insertion portion 6a of the hub 6 is fitted to a turn table 9 by placing it face to face on a magnet 11 and a yoke 12 and positioned by inserting a spindle 13 into the center hole 14 and, at the same time, the hub 6 is clamped by attracting the magnetic portion of the insertion portion 6a of the hub 6 to the magnet 11 and the yoke 12, whereby information is stored or read. In this case, the protrusion portion 6c is clamped by taking it in a clamping area 15 when said protrusion portion 6c is formed in the manner as shown in FIG. 1. When the clamping area 15 is shallow, the magnetic portion of the insertion portion 6a is positioned flush with the disc substrate 2 in the manner as shown in FIG. 2, and when the clamping area is small in diameter, a diameter of the protrusion portion 6c is made small in the manner as shown in FIG. 3. In either case, a dimension of the flange portion 6b of the hub 6 remains unchanged and an adhesive area of the adhesive layer 7 can be maintained constant, thereby increasing the adhesive strength between the hub 6 and the disc substrate 2.

In this connection, the shape and structure of the disc substrate 2 and hub 6 can be varied as desired, and the protective layer 16 is not always necessary.

What is claimed is:

1. An information recording disc comprising:
   one disc substrate having a center hole and a recording layer on one side thereof, and the disc substrate being composed of a thermoplastic resin;
   one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate and the lower portion of the insertion portion of the hub protrudes from the surface opposite to the recording layer side of the disc substrate and the protrusion portion has an outer diameter smaller than that of the insertion portion of the hub, and
   an adhesive layer formed between said flange portion and said disc substrate.

2. An information recording disc comprising:
   one disc substrate having a center hole and a recording layer on one side thereof, the disc substrate being composed of a thermoplastic resin;
   one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate; and
   an adhesive layer formed between said flange portion and said disc substrate;
   wherein the lower portion of the insertion portion of the hub protrudes from the surface opposite to the recording layer side of the disc substrate.

3. An information recording disc comprising:
   one disc substrate having a center hole and a recording layer on one side thereof, the disc substrate being composed of a thermoplastic resin;
   one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate; and
   an adhesive layer formed between said flange portion and said disc substrate;
   wherein the lower portion of the insertion portion of the hub protrudes from the surface opposite to the recording layer side of the disc substrate and the protrusion portion of the hub has an outer diameter the same size as that of the insertion portion of the hub.

4. A turning system for information recording discs comprising:
   an information recording disc comprising one disc substrate having a center hole and a recording layer on one side thereof, and the disc substrate being composed of a thermoplastic resin; one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate; and an adhesive layer formed between said flange portion and said disc substrate; and a turntable having a magnet, which attracts said hub of the information recording disc, set on the turntable so as to make the lower portion of said hub face to the magnet;

wherein the lower portion of the insertion portion of the hub protrudes from the surface opposite to the recording layer side of the disc substrate, said turntable has a concavity equipped with said magnet and the protrusion portion is received in the concavity.

5. A turning system for information recording discs comprising:

an information recording disc comprising one disc substrate having a center hole and a recording layer on one side thereof, and the disc substrate being composed of a thermoplastic resin; one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate; and an adhesive layer formed between said flange portion and said disc substrate; and a turntable having a magnet, which attracts said hub of the information recording disc, set on the turntable so as to make the lower portion of said hub face to the magnet;

wherein the lower portion of the insertion portion of the hub protrudes from the surface opposite to the recording layer side of the disc substrate, said turntable has a concavity equipped with said magnet and the protrusion portion is received in the concavity; and wherein the lower portion of the insertion portion of the hub protrudes from the surface opposite to the recording layer side of the disc substrate and the protrusion portion has the same diameter as that of the insertion portion of the hub.

6. A turning system for information recording discs comprising:

an information recording disc comprising one disc substrate having a center hole and a recording layer on one side thereof, and the disc substrate being composed of a thermoplastic resin; one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate; and an adhesive layer formed between said flange portion and said disc substrate; and a turntable having a magnet, which attracts said hub of the information recording disc, set on the turntable so as to make the lower portion of said hub face to the magnet;

wherein the lower portion of the insertion portion of the hub protrudes from the surface opposite to the recording layer side of the disc substrate, said turntable has a concavity equipped with said magnet and the protrusion portion is received in the concavity; and wherein the lower portion of the insertion portion of the hub protrudes from the surface opposite to the recording layer side of the disc substrate and the protrusion portion has an outer diameter smaller than that of the insertion portion of the hub.

* * * * *